(12) United States Patent
Ghaly et al.

(10) Patent No.: US 8,023,215 B1
(45) Date of Patent: Sep. 20, 2011

(54) DATA RECOVERY SCAN BASED ON HEAD PERFORMANCE

(75) Inventors: Mai A. Ghaly, Bloomington, MN (US); James E. Angelo, Savage, MN (US); Akhila Tadinada, Bloomington, MN (US); Paul J. Choquette, Glendale, RI (US); Kenneth R. Burns, Cannon Falls, MN (US); Kevin M. Bailey, Belle Plaine, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 12/786,796

(22) Filed: May 25, 2010

(51) Int. Cl.
 *G11B 27/36* (2006.01)
(52) U.S. Cl. ....................................................... 360/31
(58) Field of Classification Search .................. 360/31, 360/46, 53, 55, 58, 60, 78.06; 711/100; 714/8, 714/42, 54
See application file for complete search history.

(56) References Cited

U.S. PATENT DOCUMENTS

| | | | | |
|---|---|---|---|---|
| 3,562,635 A * | 2/1971 | Parker | ........................... | 324/212 |
| 4,506,305 A * | 3/1985 | Cardero | ........................... | 360/46 |
| 4,725,968 A * | 2/1988 | Baldwin et al. | ................ | 702/186 |
| 6,034,831 A * | 3/2000 | Dobbek et al. | .................. | 360/53 |
| 6,384,995 B1 * | 5/2002 | Smith | ................................ | 360/31 |
| 6,467,054 B1 | 10/2002 | Lenny | | |
| 6,947,234 B2 | 9/2005 | Lamberts et al. | | |
| 6,976,196 B2 * | 12/2005 | Watanabe | ...................... | 714/718 |
| 7,227,708 B2 * | 6/2007 | Feng | ................................ | 360/31 |
| 7,477,466 B2 * | 1/2009 | Yoshida et al. | .................. | 360/31 |
| 7,490,261 B2 | 2/2009 | Gaertner et al. | | |
| 7,522,366 B2 | 4/2009 | Mettler et al. | | |
| 7,583,461 B2 * | 9/2009 | Kudoh et al. | ..................... | 360/53 |
| 2003/0001036 A1 * | 1/2003 | Beavers et al. | ............. | 242/334.5 |
| 2003/0048570 A1 * | 3/2003 | Galloway et al. | ........... | 360/78.06 |
| 2003/0151837 A1 * | 8/2003 | Smith et al. | ...................... | 360/31 |
| 2006/0066971 A1 | 3/2006 | Alex et al. | | |
| 2007/0074083 A1 | 3/2007 | Olds et al. | | |
| 2008/0189469 A1 | 8/2008 | Mettler et al. | | |
| 2009/0161244 A1 * | 6/2009 | Hirose et al. | ..................... | 360/31 |
| 2010/0226031 A1 * | 9/2010 | Dziak et al. | ...................... | 360/31 |

* cited by examiner

*Primary Examiner* — Fred Tzeng
(74) *Attorney, Agent, or Firm* — Leanne Taveggia Farrell; Westman, Champlin & Kelly, P.A.

(57) ABSTRACT

A method is provided that decides whether a region of data storage units in a data storage system should be scanned for defective data. A current region of data storage units affected by a write operation is determined and which select transducing head of the data storage system that corresponds with the current region is also determined. A scalar value that corresponds with the select transducing head is retrieved. The scalar value related to a condition of the select transducing head based on previously conducted performance tests. An incremented write count of the affected region is scaled by the scalar value to obtain a new increment write count. A defective data scan is performed on the affected region if the new increment write count exceeds a default write count threshold.

20 Claims, 4 Drawing Sheets

DATA RECOVERY SCAN BASED ON HEAD PERFORMANCE

BACKGROUND

Adjacent Track Interference (ATI) and Side Track Erasure (STE) are the inadvertent erasing or affecting of data that are adjacent to or near a recording head during a write operation in a data storage system. These two similar, yet different problems are head-dependent. Therefore, before factory heads are implemented into a data storage system, they are tested for ATI and STE performance. Heads that depict high levels of ATI and STE can be discarded.

One way to remedy the affects of heads that demonstrate characteristics of ATI and STE is to perform periodic scans of the media and rewrite data to eliminate defects. However, the frequency of these periodic scans are fixed. In other words, data units scanned that are affected by heads with high levels of ATI and STE will be scanned the same number of times as those data units that are not affected by erasure. In other words, fixed periodic scans might not provide enough protection to data units affected by high levels of ATI and STE or provide too much protection to data units that are not affected by erasure. Such issues affect performance efficiency of the data storage system.

Embodiments of the present invention provide solutions to these and other problems, and offer other advantages over the prior art.

SUMMARY

A data storage system includes processing circuitry configured to perform a method in deciding whether a region of data storage units in a data storage system should be scanned for defective data. The processing circuitry determines a current region of data storage units affected by a write operation and also determines which select transducing head of the data storage system that corresponds with the current region. A scalar value that corresponds with the select transducing head is retrieved. The scalar value related to a condition of the select transducing head based on previously conducted performance tests. An incremented write count of the affected region is scaled by the scalar value to obtain a new increment write count. A defective data scan is performed on the affected region if the new increment write count exceeds a default write count threshold.

Other features and benefits that characterize embodiments of the present invention will be apparent upon reading the following detailed description and review of the associated drawings.

DETAILED DESCRIPTION

Embodiments of the disclosure provide a method of deciding whether a region of data storage units in a data storage system should be scanned for defective data. The method moves away from a data storage system-based performance threshold of decision-making to a head-based threshold based on the performance of each factory-tested head. The method allows for a significant reduction in the scan frequency of heads with no or little erasure while increasing the scan rate of heads with high levels of erasure. Such a method improves performance and reliability.

Figure 1:
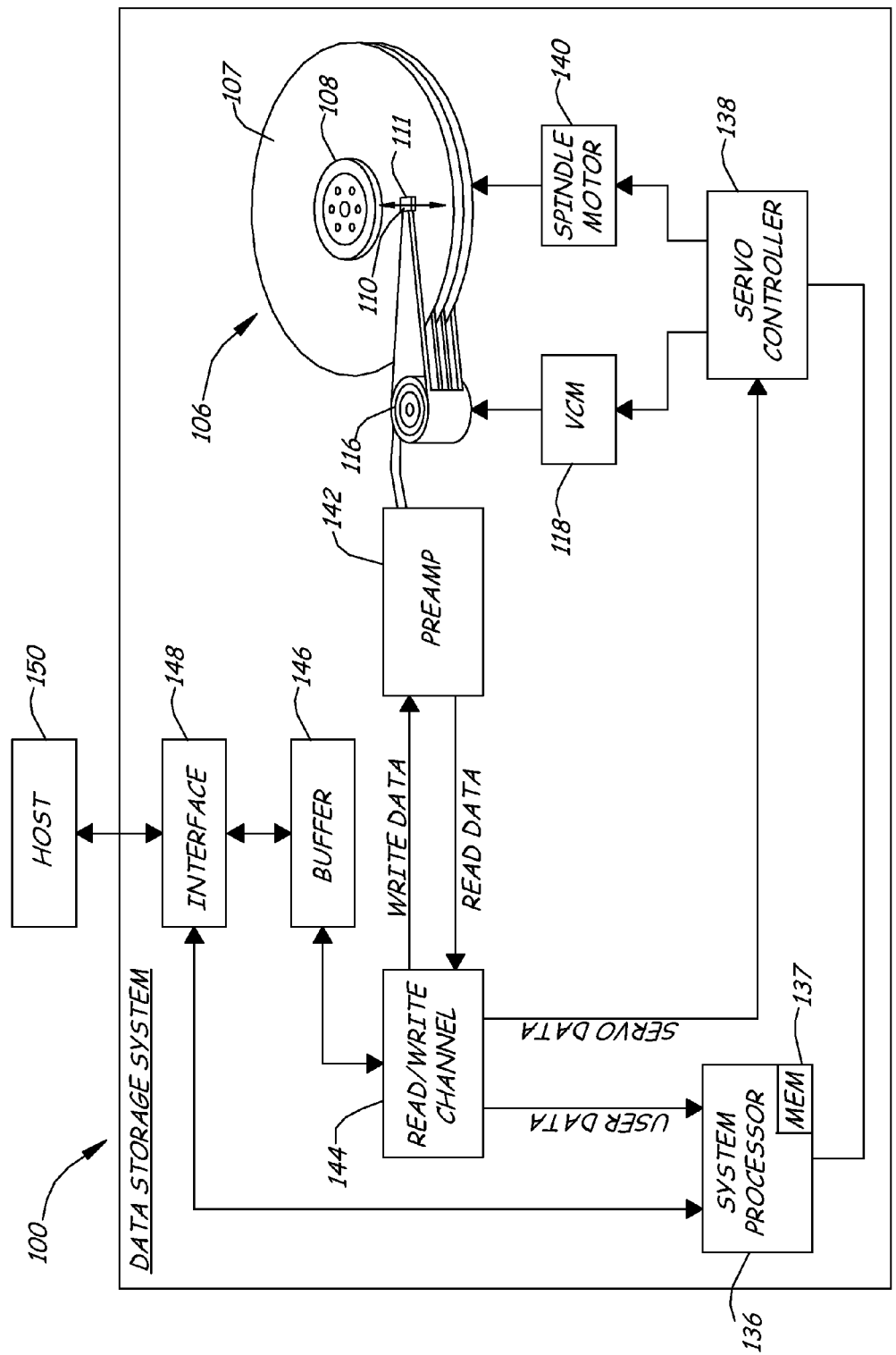
FIG. 1 is a simplified block diagram of a data storage system under one embodiment.

FIG. 1 is a simplified block diagram of a data storage system 100 under one embodiment. Data storage system 100 includes media 106, such as a plurality of discs 107, which are mounted on a spindle motor 140 by a clamp 108. Each media surface has an associated slider 110, which carries a read/write head 111 for communication with the media surface. Sliders 110 are supported by suspensions and track accessing arms of an actuator mechanism 116. For example, actuator mechanism 116 can be of the type known as a rotary moving coil actuator and includes a voice coil motor (VCM) 118. VCM 118 rotates actuator 116 about a pivot shaft to position sliders 110 over a desired data track along an arcuate path between an inner diameter and an outer diameter of, for example, a disc medium. VCM 118 is driven by electronic circuitry based on signals generated by the read/write heads and a host computer 150.

As previously discussed, media 1-6 can includes a plurality of discs 107. Each disc 107 has a plurality of substantially concentric circular tracks. Each track is subdivided into a plurality of storage segments. As defined herein, a storage segment is the basic unit of data storage in media 106. Each storage segment is identified and located at various positions on media 106. In the disc-type media example, storage segments or data sectors are "pie-shaped" angular sections of a track that are bounded on two sides by radii of the disc and on the other side by the perimeter of the circle that defines the track. Each track has related linear block addressing (LBA). LBA includes a cylinder address, head address and sector address. A cylinder identifies a set of specific tracks on the disc surface to each disc 107 which lie at equal radii and are generally simultaneously accessible by the collection of heads 111. The head address identifies which head can read the data and therefore identifies which disc from the plurality of discs 107 the data is located. As mentioned above, each track within a cylinder is further divided into sectors for storing data and servo information. The data sector is identified by an associated sector address.

Data storage system 100 includes a system processor 136, which his used for controlling certain operations of data storage system 100 in a known manner. In one embodiment, system processor 136 is also used for carrying out data recovery of flawed data sectors. The various operations of data storage system 100 are controlled by system processor 136 with the use of programming stored in memory 137. Data storage system 100 also includes servo controller 138 which generates control signals applied to VCM 118 and spindle motor 140. System processor 136 instructs servo controller 138 to seek head 111 to desired tracks. Servo controller 138 is also responsive to servo data, such as servo burst information recorded on disc 107 in embedded servo fields included in the data sectors.

Disc drive 100 further includes preamplifier (preamp) 142 for generating a write signal applied to head 111 during a write operation, and for amplifying a read signal emanating from head 111 during a read operation. A read/write channel 144 receives data from system processor 106 during a write operation, and provides encoded write data to preamplifier 142. During a read operation, read/write channel 146 processes a read signal generated by preamp 142 in order to detect and decode data recorded on disc 107. The decoded data is provided to system processor 136 and ultimately through interface 148 to host computer 150.

System processor 136 also sequentially performs a directed on-line scan (DOS) or background media scan of discs 107. DOS is a background reliability feature that allows a data storage system, without intervention from host computer 150, to scan surrounding locations of frequently written LBAs and refresh sectors that show signs of data degradation. Thus, disc drive 100 proactively finds media errors before the system writes to a location of media 106. Upon finding a read error, system processor 136 performs a read recovery operation. The read recovery operation includes a series of corrective routines stored in memory 137 in an attempt to correct read errors. After performance of the read recovery operation, system processor 136 logs recovered read errors as a function of the read recovery operation and logs unrecovered read errors if the attempt to recover the read error fails.

Adjacent track interference (ATI) and side track erasure (STE) are the inadvertent erasing or affecting of data that are adjacent to or near a recording head during a write operation in a data storage system. One drawback in the performance of DOS is that the scan frequency is fixed and independent of the head eraseability. This means that heads with high levels of ATI and/or STE will be scanned the same number of times as heads that exhibit no erasure. This causes two issues. First, DOS may not provide enough protection for heads with high erasure since the scan frequency threshold is set relatively high (to meet drive performance requirements) in comparison to the actual head need. Second, DOS may provide too much protection for heads that don't show any signs of ATI and/or STE.

Figure 2A:
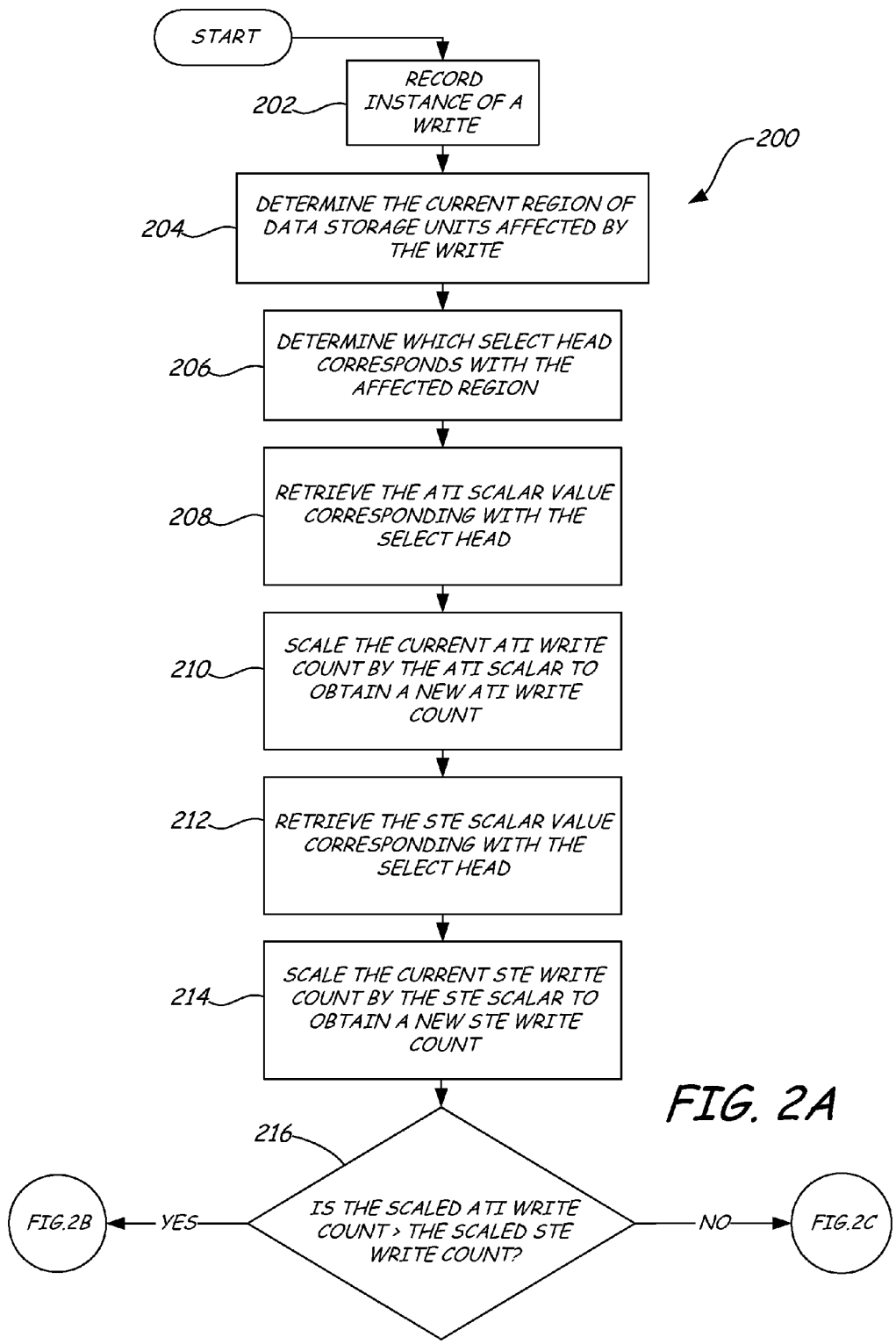
FIGS. 2A-2C illustrate a flowchart of a method of determining whether a region of data storage units on a storage medium should be scanned for defective data.
Figure 2B:
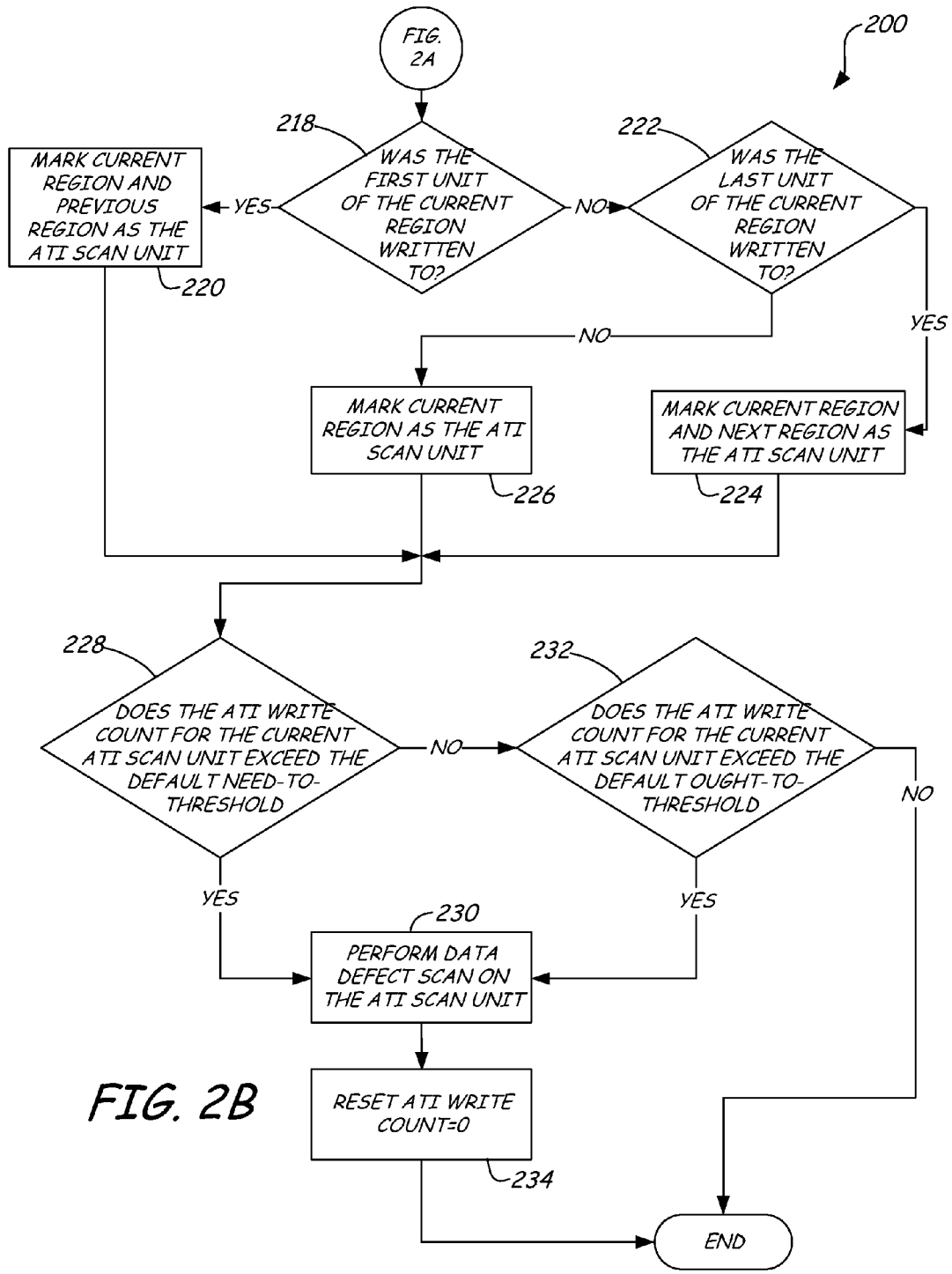
Figure 2C:
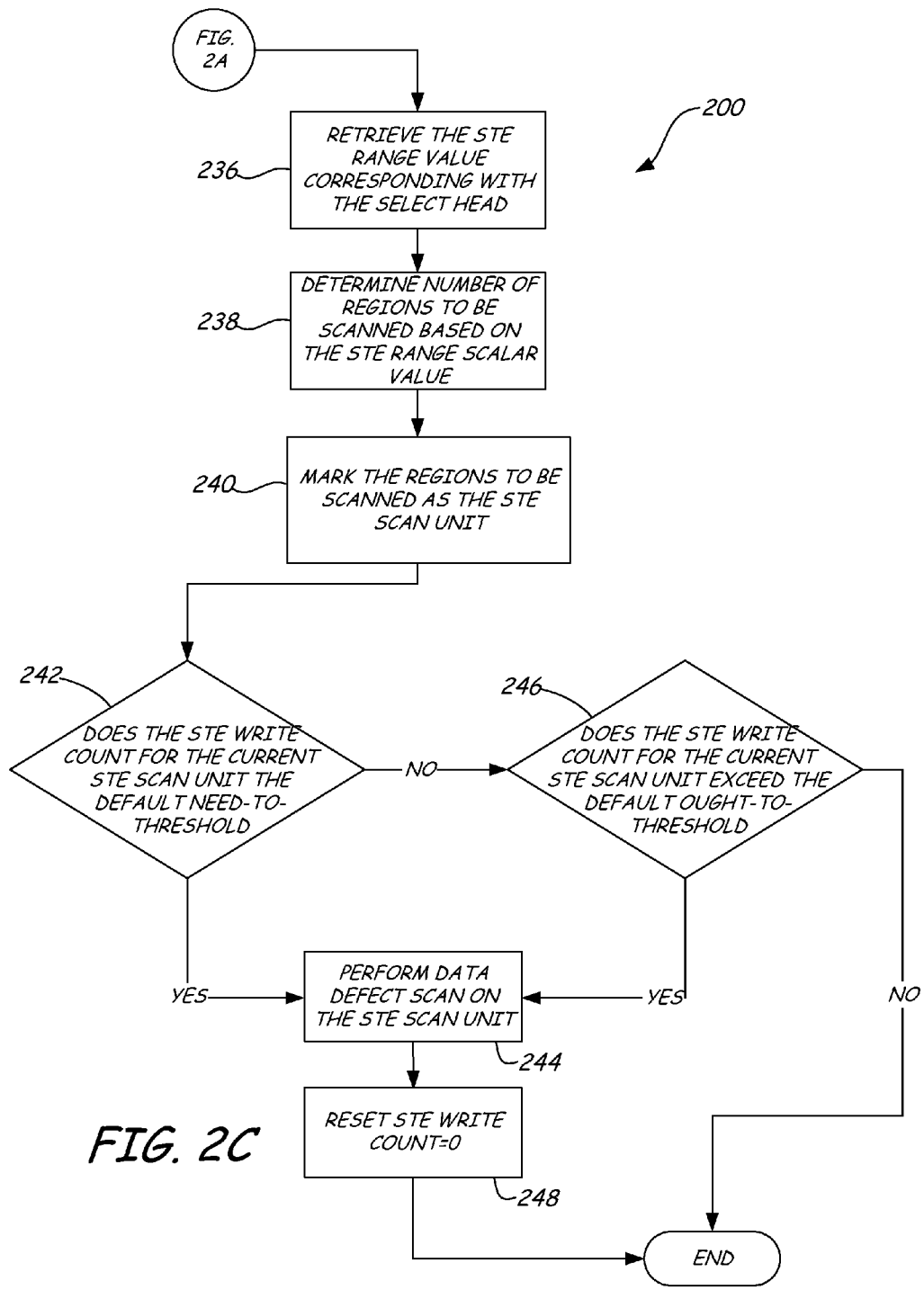

FIGS. 2A-2C illustrate a flowchart 200 of a method of determining whether a region of data storage units on a storage medium should be scanned for defective data. Such steps can be carried out by a system processor, such as system processor 136 of FIG. 1.

The blocks illustrated in FIG. 2A provide steps for determining whether a region of data storage units affected by a write operation performed by a transducing head should be scanned for reasons of ATI, for reasons of STE or not yet ready to be scanned. At block 202, an instance of a write operation is recorded and, at block 204, the current region of data storage units affected by the write are determined. Whether or not the affected data storage units should be scanned for ATI or STE depends on the transducing head that corresponds with the affected region. As such, in block 206, which select head corresponds with the affected region is determined.

At block 208, an ATI scalar value is retrieved that corresponds with the select head. ATI scalar values are determined during factory testing of heads and are stored in memory for access by the system processor, such as system processor 136. Each head is assigned an ATI scalar value based on how much the particular head exhibits ATI. The greater the ATI scalar value the worse the head is in terms of ATI performance. At block 210, the retrieved ATI scalar value is applied to the number of ATI write operations performed on the current region of data units for purposes of keeping track of how many write operations or scaled write operation have occurred since the last data scan in order to recover data lost due to ATI. In other words, the current incremented ATI write count is scaled using the retrieved ATI scalar value to obtain a new increment ATI write count. For example, one exemplary select head can have an ATI scalar value of 2. Therefore, write counts for a region of data units that correspond with the head having an ATI scalar value of 2 will be scaled as 1, 5, 9 and etc.

At block 212, a STE scalar value is retrieved that corresponds with the select head Like the ATI scalar values, STE scalar values are determined during factor testing of heads and are stored in memory for access by the system processor, such as system processor 136. Each head is assigned a STE scalar value based on how much the particular head exhibits STE. The greater the STE scalar value the worse the head is in terms of STE performance. At block 214, the retrieved STE scalar value is applied to the number of STE write operations performed on the current region of data units for purposes of keeping track of how many write operations or scaled write operation have occurred since the last data scan in order to recover data lost due to STE. In other words, the current incremented STE write count is scaled using the retrieved STE scalar value to obtain a new increment STE write count. For example, one exemplary select head can have a STE scalar value of 1. Then write counts for a region of data units that correspond with the head having a STE scalar value of 1 will be scaled as 1, 3, 5, etc.

The steps described in blocks 208, 210, 212 and 214 are used to increment the write counters for each of ATI and STE at different rates depending on the exhibited performance of the select head before the head is placed in a data storage system. It should be realized that each time a write operation occurs in a particular region of data units, the write count since the data was scanned for defects because of ATI will be different than the write count since the data was scanned for defect because of STE. At decision block 216, the new ATI write count (which has been scaled by the ATI scalar value) is compared to the new STE write count (which has been scaled by the STE scalar value) to determine if the new ATI write count is greater than the new STE write count. If so, the flowchart 200 is directed to FIG. 2B to determine if data should be scanned for purposes of recovering data lost to ATI. If not, the flowchart 200 is directed to FIG. 2C to determine if data should be scanned for purposes of recovering data lost to STE.

The blocks illustrated in FIG. 2B provide steps for determining whether the current region of data storage units affected by a write operation performed by a transducing head should be scanned for reasons of ATI. In a data scan due to the effects of ATI, only the current scan unit that was written to is scanned. Such is the case because, in general, ATI affects only data tracks adjacent to the head. However, as will be described in detail, if the first or the last track of the scan unit is written to then the previous or next scan unit will also be scanned.

At decision block 218, it is determined whether the first unit of the current data region was written to. If so, flowchart 200 proceeds to block 220 and marks the current data region and the previous data region as the ATI scan unit. If not, flowchart 200 proceeds to decision block 222 and determines if the last unit of the current data region was written to. If so, flowchart 200 proceeds to block 224 and marks the current data region and the next data region as the ATI scan unit. If not, flowchart 200 proceeds to block 226 and marks the current data region as the ATI scan unit.

After determining what will be considered the ATI scan unit, at decision block 228 it is decided whether the ATI write count for the current ATI scan unit exceeds the default need-to-threshold. As previously discussed, the ATI write count is a scaled number of times the data region has been written to since it was last scanned because of ATI based on performance of the particular head. In block 228, the ATI write count is compared to a threshold write count when a defective data scan needs to be performed. If the ATI write count exceeds the default need-to-threshold, then the flowchart 200 proceeds to block 230 and a defective data scan is performed on the ATI scan unit. If the ATI write count does not exceed the default need-to-threshold, then the flowchart 200 proceeds to decision block 232.

At block 232, the ATI write count is compared to a threshold write count when a defective data scan ought to be performed. If the ATI write count exceeds the default ought-to-threshold, then the flowchart 200 also proceeds to block 230 and a defective data scan is performed on the ATI scan unit. If the ATI write count does not exceed the default need-to-threshold, then the flowchart 200 ends. After a defective data scan is performed, whether because the ATI write count exceeded the need-to-threshold or exceeded the ought-to-threshold, the flowchart 200 passes to block 234 and resets the ATI write count to zero.

With reference back to FIG. 2A and decision block 216, if the scaled ATI write count is not greater than the scaled STE write count, then the method proceeds to FIG. 2C, which provide steps for determining whether the current region of data storage units affected by a write operation performed by a transducing head should be scanned for reasons of STE. In a data scan due to the effects of STE, a number of scan units on either side of the scan unit being written to are scanned for defects. The number of scan units on either side of the scan unit written to are specified by a STE scan range also stored in memory accessible by the system processor, such as system processor 136. This STE scan range value is determined during factory testing of individual heads. Such is the case because, in general, STE affects a wider range of data tracks on a data storage medium.

At block 236, the STE range value corresponding to the select head is retrieved. For example, the STE range value can be accessed and retrieved by system processor 136 from memory 137. At block 238, the number of data regions or scan units to be scanned are determined based on the STE range value. At block 240, the data regions or scan units to be scanned are marked as the STE scan unit.

After determining what will be considered the STE scan unit, at decision block 242 it is decided whether the STE write count for the STE scan unit exceeds the default need-to-threshold. As previously discussed, the STE write count is a scaled number of times the data region has been written to since it was last scanned because of STE based on performance of the particular head. In block 242, the STE write count is compared to a threshold write count when a defective data scan needs to be performed. If the STE write count exceeds the default need-to-threshold, then the flowchart 200 proceeds to block 244 and a defective data scan is performed on the STE scan unit. If the STE write count does not exceed the default need-to-threshold, then the flowchart 200 proceeds to decision block 246.

At block 246, the STE write count is compared to a threshold write count when a defective data scan ought to be performed. If the STE write count exceeds the default ought-to-threshold, then the flowchart 200 also proceeds to block 244 and a defective data scan is performed on the STE scan unit. It the STE write count does not exceed the default need-to-threshold, then the flowchart 200 ends. After a defective data scan is performed, whether because the STE write count exceeded the need-to-threshold or exceeded the ought-to-threshold, the flowchart 200 passes to block 248 and resets the STE write count to zero.

Heads that demonstrate significant erasure present a great reliability risk if DOS scan are not performed at a low enough threshold. Meanwhile, heads that demonstrate less erasure can be scanned less often and still provide reliable performance. Having DOS scan thresholds based on head performance allows for the more "at risk" heads to be scanned more often and less "at risk" heads less often. In addition to the reliability benefit, this provides for maximal performance since performing DOS scans can impact the user's ability to access data. The data storage system needs to share its time between performing DOS scans and accessing user data. If the thresholds are very low, meaning DOS scans are performed frequently, there is an impact on performance. In some experiments conducted, low thresholds on all heads can have up to a 12% performance impact. In other experiments, where one head from an eight head data storage system were to need the lowest thresholds, while the other seven heads could be at higher thresholds, the impact on performance can be limited to about 6%.

It is to be understood that even though numerous characteristics and advantages of various embodiments have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is directed to a data storage system for disc media, it will be appreciated by those skilled in the art that the teachings of the present invention can be applied to other types of data storage systems, without departing from the scope and spirit of the present invention.

What is claimed is:

1. A method of deciding whether a region of data storage units in a data storage system should be scanned for defective data, the method comprising:
   determining a current region of data storage units affected by a write operation;
   determining which select transducing head of the data storage system corresponds with the current region;
   retrieving a scalar value that corresponds with the select transducing head, the scalar value related to a condition of the select transducing head based on previously conducted performance tests;
   scaling an incremented write count of the affected region by the scalar value to obtain a new increment write count; and
   performing a defective data scan on the affected region if the new increment write count exceeds a default write count threshold.

2. The method of claim 1, further comprising resetting the new increment write count to zero after performing the defective data scan.

3. The method of claim 1, wherein retrieving a scalar value comprises retrieving an Adjacent Track Interference (ATI) scalar value that corresponds with the select transducing head, the ATI scalar value related to ATI performance of the select transducing head based on the previously conducted performance tests.

4. The method of claim 3, wherein scaling the incremented write count of the affected region comprises scaling an ATI increment write count of the affected region by the ATI scalar value to obtain a new ATI increment write count.

5. The method of claim 4, wherein retrieving a scalar value comprises retrieving a Side Track Erasure (STE) scalar value that corresponds with the select transducing head, the STE scalar value related to STE performance of the select transducing head based on the previously conducted performance tests.

6. The method of claim 5, wherein scaling the incremented write count of the affected region comprises scaling a STE increment write count of the affected region by the STE scalar value to obtain a new STE increment write count.

7. The method of claim 6, wherein prior to performing a defective data scan further comprising determining if the new ATI increment write count is greater than the new STE increment write count.

8. The method of claim 7, further comprising marking the current region, a previous region if the first unit in the current region was affected by a write operation and a next region if the last unit in the current region was affected by the write operation as a ATI scan unit.

9. The method of claim 8, wherein performing the defective data scan comprises performing the defective data scan if the new ATI increment write count is greater than the new STE increment write count and if the ATI increment write count exceeds a default need-to-scan write count threshold or a default ought-to-scan write count threshold.

10. The method of claim 7, further comprising:
retrieving a STE range value that corresponds with the select transducing head;
determining a number of regions to be scanned based on the STE range value; and
marking the regions to be scanned as a STE scan unit.

11. The method of claim 10, wherein performing the defective data scan comprises performing the defective data scan if the new STE increment write count is greater than the new ATI increment write count and if the STE increment write count exceeds a default need-to-scan write count threshold or a default ought-to-scan write count threshold.

12. A storage system that stores data in storage segments comprises processing circuitry configured to:
determine a current region of data storage units affected by a write operation;
determine which select transducing head of the data storage system corresponds with the current region;
retrieve a scalar value from memory that corresponds with the select transducing head, the scalar value related to a condition of the select transducing head based on previously conducted performance tests;
scale an incremented write count of the affected region by the scalar value to obtain a new increment write count; and
perform a defective data scan on the affected region if the new increment write count exceeds a default write count threshold.

13. The system of claim 12, wherein the processing circuitry:
retrieves an Adjacent Track Interference (ATI) scalar value that corresponds with the select transducing and relates to the ATI performance of the select transducing head based on the previously conducted performance tests; and
scales an ATI incremented write count of the affected region by the ATI scalar value to obtain a new ATI increment write count.

14. The system of claim 13, wherein the processing circuitry:
retrieves a Side Track Erasure (STE) scalar value that corresponds with the select transducing and relates to STE performance of the select transducing head based on the previously conducted performance tests; and
scales a STE incremented write count of the affected region by the STE scalar value to obtain a new STE increment write count.

15. The system of claim 14, wherein prior to the processing circuitry performing a defective data scan, the processing circuitry determines if the new ATI increment write count is greater than the new STE increment write count.

16. The system of claim 15, wherein the processing circuitry:
performs the defective data scan if the new ATI increment write count is greater than the new STE increment write count and the new ATI increment write count exceeds a default need to scan write count threshold or a default ought to scan write count threshold; and
performs the defective data scan if the new STE increment write count is greater than the new ATI increment write count and the new STE increment write count exceeds a default need-to-scan write count threshold or a default ought-to-scan write count threshold.

17. A method of deciding whether a region of data storage units in a data storage system should be scanned for defective data, the method comprising:
determining a current region of data storage units affected by a write operation;
determining which select transducing head of the data storage system corresponds with the current region;
retrieving an Adjacent Track Interference (ATI) scalar value that corresponds with the select transducing head, the ATI scalar value related to ATI performance of the select transducing head based on previously conducted performance tests;
scaling an ATI incremented write count of the affected region by the ATI scalar value to obtain a new ATI increment write count; and
performing a defective data scan on the affected region if the new ATI increment write count exceeds a default need-to-scan write count threshold or a default ought-to-scan write count threshold.

18. The method of claim 17, wherein prior to performing the defective data scan further comprising marking the current region and a previous region if the first unit in the current region was affected by a write operation as a ATI scan unit.

19. The method of claim 17, wherein prior to performing the defective data scan further comprising marking the current region and a next region if the last unit in the current region was affected by the write operation as a ATI scan unit.

20. The method of claim 17, further comprising resetting the new ATI increment write count to zero after performing the defective data scan.

* * * * *